ial filter-medium, that is, the corrosion-resistant filter medium, so that the first or preliminary filter medium need not be corrosion-resistant, and may be an inexpensive material such as plain steel wire cloth or other forms of plain steel.

United States Patent Office
3,071,445
Patented Jan. 1, 1963

3,071,445
SULFUR PURIFICATION PROCESS
Frederick J. Gormley, Jaltipan, Veracruz, Mexico, assignor to Pan American Sulphur Company, Dallas, Tex., a corporation of Delaware
No Drawing. Filed Jan. 5, 1960, Ser. No. 484
Claims priority, application Mexico Jan. 12, 1959
4 Claims. (Cl. 23—224)

This invention relates to the purification of sulfur contaminated with hydrocarbons and relates more particularly to acid-clay treating processes for the purification of such sulfur.

Currently, in the purification of crude sulfur contaminated with hydrocarbons, the hydrocarbons, usually petroleum hydrocarbons, contained in the crude sulfur, are separated therefrom by the treatment of the sulfur with activated clay, or by treatment with small percentages of acid followed by treatment with activated clay. Clay treatment alone is intended to remove hydrocarbons by adsorption, the clay with adsorbed hydrocarbons being separated from the sulfur by filtration. In the acid-clay treatment, the small percentages by weight of acid (up to 1%) used, are intended to carbonize the hydrocarbons, and the follow-up treatment with activated clay is intended to adsorb on the clay some of the hydrocarbons and excess acid which is not consumed in the carbonizing reaction. The corrosive sulfur-clay mix is then filtered to separate the clay with its content of adsorbed hydrocarbons and acid, and the carbon or "coke," from the mix as a filter cake. The purified sulfur is recovered as a filtrate. This filtration requires the use of expensive corrosion-resistant metal alloys in the metal filter screen or medium usually employed.

It is among the objects of this invention to provide an acid-clay treating process for the purification of crude sulfur contaminated with hydrocarbons, which process will greatly reduce the quantity of activated clay required for removal of the coloring matter, and permit the use in part and in lieu of expensive activated clay, of less expensive natural clay or spent clay, or both, and which will enable filtration of the corrosive mix for recovery of the filtrate of purified sulfur, to be carried out without the necessity of using expensive metal alloys in the metal filter screen or other metal filter medium employed.

Another object of this invention is to provide an acid-clay treating process for the purification of sulfur contaminated with hydrocarbons, which can be applied to existing sulfur filter plants, which use clay for adsorption only, with only minor modifications to the plant, so that the need for large conversion investments may be avoided.

Other and further objects and advantages of this invention will appear from the following description and the appended claims.

According to the present invention, molten sulfur with its content of contaminating hydrocarbons, usually petroleum hydrocarbons, is intimately mixed with a weight percent of concentrated sulfuric acid in excess of the weight percent of contaminants in the sulfur. In general, the weight percent of acid required is small, for example, up to one percent. The acid concentration should be at least 93%, but not more than 100%. The reaction of the concentrated acid with the hydrocarbons results in the formation in the mix, of reaction products including some insoluble carbon or "coke" and a mixture of sulfonic acids, organic sulfates, sulfones, sulfonates, etc. The weight percent of sulfuric acid added to the sulfur is, as noted above, in excess of the weight percent of petroleum contaminant, and the mixture of sulfonic acids, organic sulfates, sulfones, sulfonates, etc., formed by the reaction, is dissolved in this excess of sulfuric acid. According to a feature of the present invention, the reaction is interrupted at the end of a suitable period, advantageously 10 to 30 minutes, preferably about 20 minutes, by isolating or partially isolating this excess sulfuric acid from the sulfur by adsorption of the excess acid on spent filter cake as hereinafter defined, or natural clay, or a mixture of both, added to the mix.

By "spent filter cake" is meant: filter cake containing spent clay, such, for example, as filter cake obtained in the filtration of sulfur to which activated clay has been added to adsorb hydrocarbons contained in the sulfur and thus becomes spent.

The excess sulfuric acid is preferentially adsorbed on the clay and, because of the affinity of both spent clay and natural clay for this adsorption, an activated clay is not required for this purpose. As a result of the admixture of the spent filter cake and/or natural clay, to the mix, the mixture of sulfonic acids, organic sulfates, sulfones, sulfonates, etc., is transferred from solution in the excess acid into solution in the sulfur phase of the mix.

This mix of acid, sulfur, reaction products including carbon or "coke," spent filter cake and/or natural clay, is then filtered in a first or preliminary filter stage, on a filter medium which has been pre-coated with filter cake obtained in a second or polishing filter stage of the process as will more fully appear hereinafter.

This preliminary filtering stage effects the removal of the insoluble carbon or "coke" and terminates the reaction by removal of the spent filter cake and/or natural clay with its content of adsorbed acid, and produces, as filtrate, a discolored sulfur containing the sulfonates, sulfates, sulfones, etc., of the original reaction. It will be understood that the adsorption of the acid by the clay requires time. The duration of the time of mixing from and after the addition of the spent filter cake and/or natural clay, is, however, quite definitely fixed. Because the spent filter cake and/or natural clay can "crack" petroleum hydrocarbon molecules present in the mix into smaller hydrocarbon molecules, which, in turn, sulfonate with the excess acid (these smaller sulfonate molecules being more difficultly adsorbed on activated clay), it is necessary to effect the separation of the spent filter cake and/or natural clay from the mix before excessive sulfonate formation can take place. Experience indicates that, in practice, the duration of the time of mixing, is critical, and lies between twenty and thirty minutes. Below twenty minutes the reaction is incomplete, and above thirty the sulfonates are difficultly removed.

The filtrate, that is, the discolored sulfur, is next treated with small quantities of activated clay which readily adsorbs the coloring matter (sulfonates, sulfates, sulfones, etc.). The filtrate-clay mix, now non-corrosive, is filtered in the second or polishing stage above-mentioned, against a clean filter medium, the filtrate thus obtained constituting the pure yellow sulfur desired as a product. The filter cake thus obtained is recovered and used as a pre-coat for the filter medium employed in the first or preliminary filtration stage referred to above.

Among the advantages which the process of this invention affords over current practice for the purification of sulfur, are:

(1) It permits the use of less expensive natural clay or of spent filter cake from an allied operation, or of a mixture of both, to adsorb preferentially the excess acid.

(2) By preliminary filtration of the reaction mixture treated with spent filter cake and/or natural clay, the quantity of activated clay required for removal of the coloring matter (sulfonates, sulfates, sulfones, etc.) is greatly reduced.

(3) By carrying out the two major steps of the separation separately, with the filter cake of the second or color-removal filtration operation serving as a pre-coat for the filter medium in the filtration of the corrosive mixture fed to the first or preliminary filter operation, the need for use of expensive metal alloys in the filter medium is avoided since the pre-coat effectively protects the filter medium from corrosion.

(4) Since this operation can be applied to existing sulfur filter plants, which use clay for adsorption only, with only minor modifications, no conversion investments are required.

The process is illustrated by the following example.

*Example*

Crude sulfur at a temperature of 130° to 145° C. and containing 0.4 percent by weight of carbon was treated with 0.6 percent by weight of sulfuric acid of 93 percent concentration. After reaction for 20 minutes there was added to the reaction mixture approximately 0.4 percent by weight of a mixture of equal parts of natural clay and spent filter cake obtained in the adsorption filtration of sulfur with activated clay for the removal of coloring matter. After 20 minutes of mixing following addition of the spent filter cake and natural clay, the material was filtered in a first filtering stage against a filter screen pre-coated with spent filter cake obtained in a second filtering stage of the process. The filtrate, a non-corrosive sulfur, reddish-brown in color and containing 0.12 percent by weight of carbon, was treated by the addition thereto of 0.2 percent by weight of activated clay which was thoroughly mixed therewith. This material, was then filtered in a second or decolorizing or polishing filtering stage against a clean filter screen, and the filtrate, a yellow sulfur containing 0.05 percent by weight of carbon, recovered as a product. Filter cake obtained in this second stage was used to pre-coat filter screens used as the pre-coated filter screens in the carrying out of the first stage filtration operation.

The invention in its broader aspects is not limited to the specific process and steps described but departures may be made therefrom, within the scope of the accompanying claims, without departing from the principles of the invention and without sacrificing its chief advantages.

What is claimed is:

1. A process for the purification of sulfur contaminated with hydrocarbons, which comprises: intimately mixing the contaminated sulfur in a molten state with a weight percent of concentrated sulfuric acid in excess of the weight percent of contaminants in the sulfur, the acid concentration being at least 93% and not more than 100%; reacting the mixture for a period of time sufficient to cause carbonization, sulfation and sulfonation of at least some of the hydrocarbons; intimately mixing the reaction mixture, at the end of said period, with an adsorption medium selected from the group of adsorption mediums consisting of spent filter cake obtained in the adsorption filtration of sulfur for the removal of coloring matter, natural clay and mixtures thereof, for a period of time lying between twenty and thirty minutes and with a quantity of said adsorption medium sufficient to adsorb the excess sulfuric acid; filtering the product of the mixing of the reaction mixture and said selected adsorption medium, in a first filtering stage against a filter medium pre-coated with filter cake obtained in a subsequent filtering stage of the process; recovering the filtrate; intimately mixing the filtrate with activated clay; filtering the mixture of filtrate and activated clay in a second filtering stage against a clean filter medium; recovering the filtrate of said second stage as the desired purified sulfur product; and, recovering filter cake deposited on said clean filter medium for pre-coating said first stage filter medium.

2. The process of claim 1 in which the period of reacting of the mixture of sulfuric acid and sulfur is in the range of from about 10 to about 30 minutes.

3. A process for the purification of crude sulfur containing approximately 0.4% by weight of carbon, which comprises intimately mixing the crude sulfur at a temperature in the range of from about 130° C. to about 145° C. with approximately 0.6 percent by weight of sulfuric acid of a concentration between 93% and 100%; reacting the mixture for a period of approximately twenty minutes; intimately mixing the reaction mixture at the end of said period with approximately 0.4% by weight of a mixture of natural clay and of spent filter cake obtained in the adsorption filtration of sulfur for the removal of coloring matter, for a period of approximately twenty minutes; filtering the product of the last-mentioned mixing step in a first filtering stage against a filter medium pre-coated with filter cake obtained in a subsequent filtering stage of the process; recovering the filtrate; intimately mixing the filtrate with approximately 0.2% by weight of activated clay; filtering the mixture of filtrate and activated clay in a second filtering stage against a clean filter medium; recovering the filtrate of said second stage as the desired purified sulfur; and, recovering filter cake deposited on said filter medium for pre-coating said first stage filter medium.

4. A process for the purification of sulfur contaminated with hydrocarbons, which comprises: treating the sulfur in a molten state with a weight percent of concentrated sulfuric acid in excess of the weight percent of contaminants in the sulfur, the acid concentration being at least 93% and not more than 100%; reacting the mixture for a period of time sufficient to cause carbonization, sulfation and sulfonation of at least some of the hydrocarbons; treating the reaction mixture, at the end of said period, with an adsorption medium selected from the group of adsorption mediums consisting of spent filter cake, natural clay and mixtures thereof, for a period of time lying between twenty and thirty minutes and with a quantity of said adsorption medium sufficient to adsorb the excess sulfuric acid; filtering the product of treatment of the reaction mixture in a preliminary filtering stage to separate the solids and recover a relatively non-corrosive filtrate; treating the filtrate with activated clay; and filtering the treated filtrate in a separate filtering stage to recover the filtrate of said separate stage as the desired purified sulfur.

References Cited in the file of this patent

UNITED STATES PATENTS

| | | |
|---|---|---|
| 1,331,646 | Hood | Feb. 24, 1920 |
| 1,926,829 | Winkler et al. | Sept. 12, 1933 |
| 2,459,764 | Yeiser | Jan. 18, 1949 |

FOREIGN PATENTS

| | | |
|---|---|---|
| 8,097 1912 | Great Britain | Apr. 3, 1913 |

UNITED STATES PATENT OFFICE
CERTIFICATE OF CORRECTION

Patent No. 3,071,445 January 1, 1963

Frederick J. Gormley

It is hereby certified that error appears in the above numbered patent requiring correction and that the said Letters Patent should read as corrected below.

Column 4, line 32, after "said" insert -- clean --.

Signed and sealed this 5th day of November 1963.

(SEAL)
Attest:

ERNEST W. SWIDER
Attesting Officer

EDWIN L. REYNOLDS

Acting Commissioner of Patents